July 5, 1966  E. R. LEE  3,259,349
REAR VIEW MIRROR
Filed May 10 1965  2 Sheets-Sheet 1
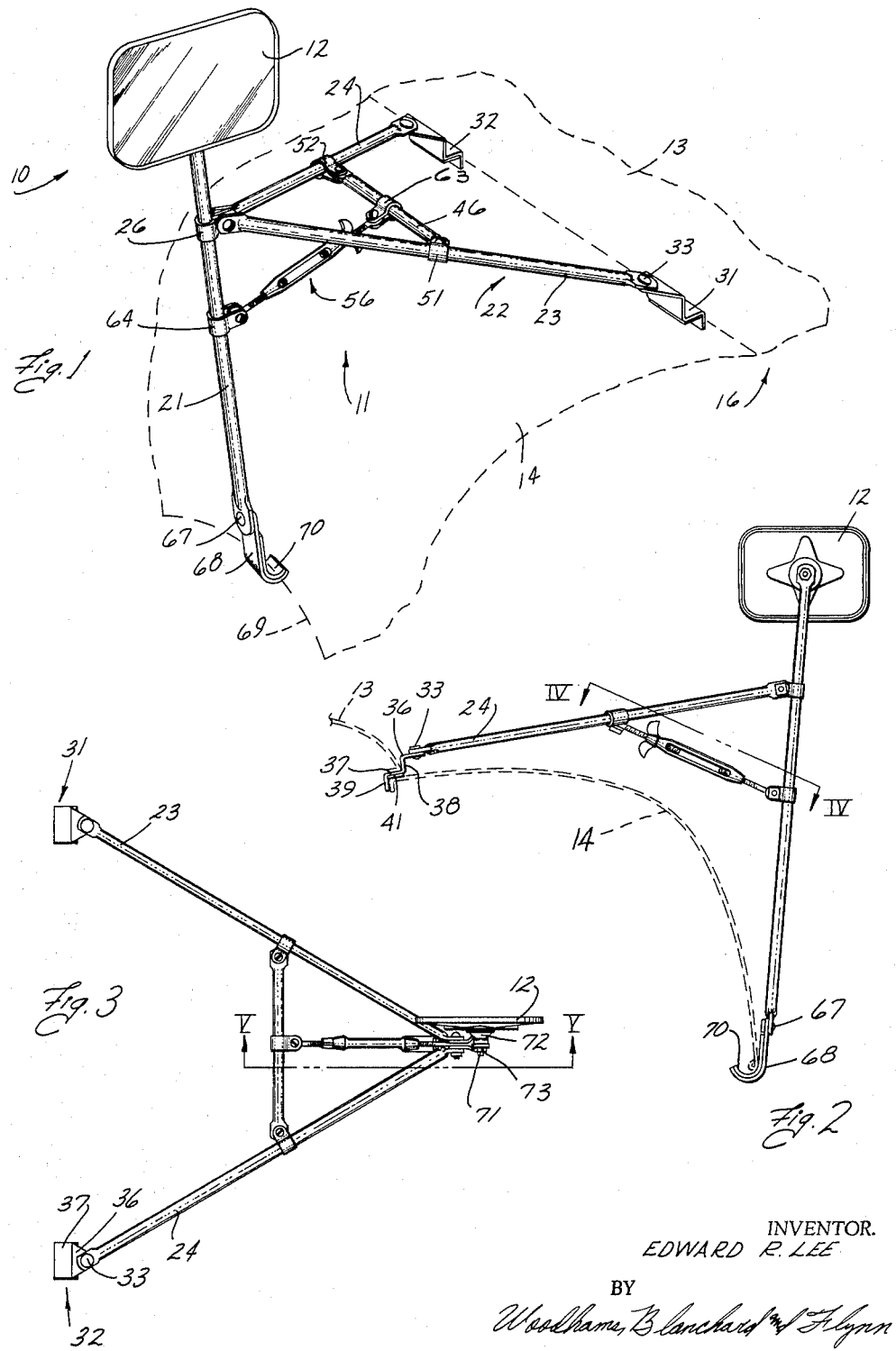
INVENTOR.
EDWARD R. LEE
BY
ATTORNEYS

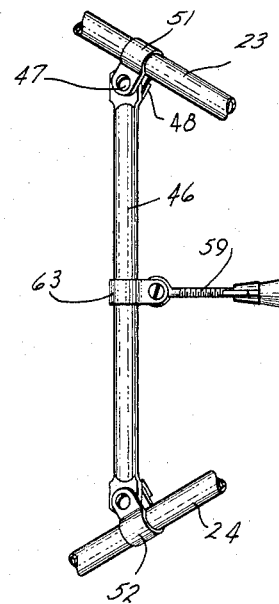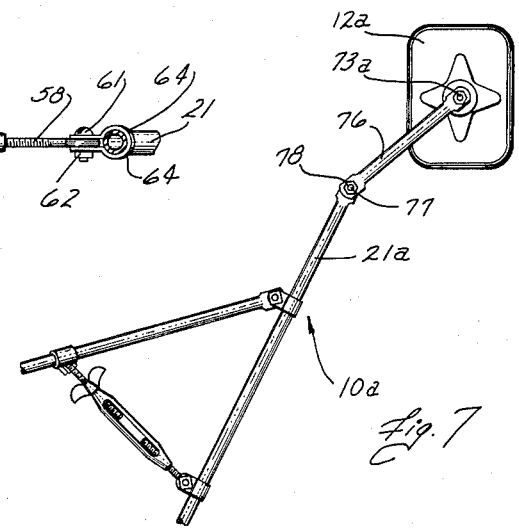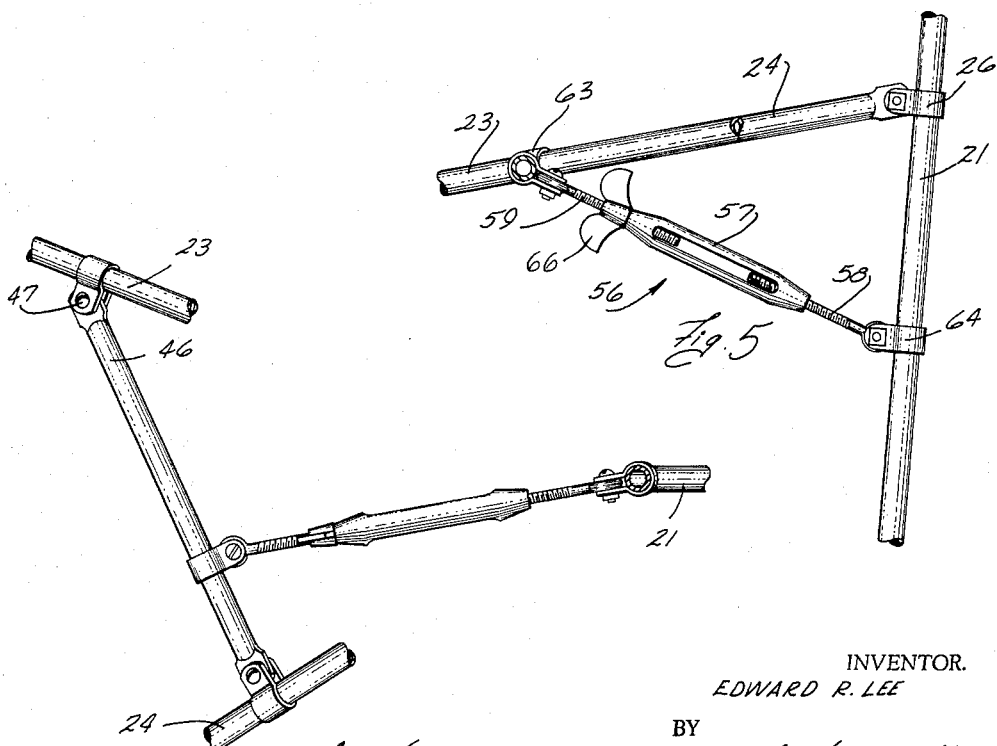

United States Patent Office
3,259,349
Patented July 5, 1966

3,259,349
REAR VIEW MIRROR
Edward R. Lee, Ceresco, Mich., assignor to S. H. Leggitt Company, Marshall, Mich., a corporation of Michigan
Filed May 10, 1965, Ser. No. 454,476
10 Claims. (Cl. 248—226)

This invention relates to a rear-view mirror construction and more particularly relates to a rear-view mirror construction having a support frame which is rigidly mountable on the outside of a vehicle and is readily removable from the vehicle.

With growing numbers of vehicles towing trailers, there is an increasing demand for rear-view mirror constructions which support the mirror in a position outwardly spaced from the side of the vehicle for enabling the driver to see what lies behind a relatively wide trailer being towed. It is desirable that the mirror support be sufficiently sturdy as to support a relatively large and heavy mirror at a substantial distance from the vehicle without allowing the mirror to vibrate or become misadjusted while the vehicle is in motion. Many users require that the mirror construction be quickly and readily installable and removable from the vehicle, as in the case of trailer owners wishing to use the mirror only during relatively infrequent hauling of the trailer. Others, particularly trailer rental agencies which also supply mirrors to their clientele, require that such mirror constructions be adaptable by simple adjustments and with a minimum of time and effort to a wide variety of cars and trucks without in any way damaging or requiring modification of the vehicle.

Previous mirrors of the type described have in general not been completely satisfactory in use either when permanently installed or when frequently removed from and installed on a particular vehicle or a series of different vehicles. Previous mirror constructions are known, for example, in which the upper portion of the mirror support is affixed to a door of the vehicle and the remainder depends therefrom and rests against the lower port of the door, the mirror construction being held in position merely by its own weight. Mirrors on such constructions have been found to vibrate and even to move out of adjustment as a result of engine vibration, bumps in the road or wind loading.

Prior mirror constructions which depend upon a spring or other resilient member to clamp the mirror construction in position on the vehicle have in general also been unsatisfactory. Such constructions have often been insufficiently rigid as to maintain the mirror fixed with respect to the vehicle and driver particularly on rough roads or the like, the mirror often vibrating or shifting to a new position.

Accordingly the objects of this invention include:

(1) To provide a rear-view mirror construction which includes a mirror support rigidly but removably affixable to a vehicle.

(2) To provide a construction, as aforesaid, capable of rigidly supporting a large heavy mirror at a position outwardly spaced from the body of the vehicle without allowing the mirror to vibrate and without flexing or becoming displaced despite wind loading, vibration or mechanical shocks imparted thereto by operation of the vehicle at high speeds or on rough roads.

(3) To provide a mirror construction, as aforesaid, which is readily adaptable without modification to a wide variety of cars and trucks, substantially of all makes, models and years, without modification or damage to the vehicle and with at most a few adjustments which can be carried out by the user without instruction with a simple screw driver and pliers.

(4) To provide a construction, as aforesaid, which when once adapted to a particular vehicle may be installed and removed quickly by the user without training and without tools by making a simple adjustment of the construction.

(5) To provide a construction, as aforesaid, which is capable of supporting a wide variety of mirrors of differing sizes and types without modification.

(6) To provide a mirror construction, as aforesaid, which when properly installed preloads the members thereof to maintain same in rigid relationship to each other.

(7) To provide a mirror construction, as aforesaid, which is readily manufacturable from commonly available parts with only rudimentary operations thereon, which can be manufactured singly with common hand tools or mass produced in large quantities, which is low in cost to manufacture and maintain, which is sturdily constructed for a long service life and capable of being maintained by the user without special training and with commonly available tools.

Other objects and purposes of this invention will become apparent to persons acquainted with apparatus of this general type upon reading the following specification and inspecting the accompanying drawings.

In the drawings:

FIGURE 1 is an oblique view of a mirror construction embodying the invention and installed in a position of use on a vehicle indicated in broken lines.

FIGURE 2 is a front elevational view of the mirror construction of FIGURE 1.

FIGURE 3 is a top elevation view of the mirror construction of FIGURE 1.

FIGURE 4 is an enlarged fragmentary sectional view substantially as taken on the line IV—IV of FIGURE 2.

FIGURE 5 is an enlarged fragmentary sectional view substantially as taken on the line V—V of FIGURE 3.

FIGURE 6 is a view similar to FIGURE 4 showing the parts thereof at a different position of operation.

FIGURE 7 is a fragment of FIGURE 2 with the positions of the parts changed and showing a modification.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal direction of the vehicle motion, forwardly being toward the left and rearwardly being toward the right in FIGURE 1. The words "inwardly" and "outwardly" will refer to directions toward and away from respectively the geometric center of the device and designated parts thereof. Said terminology will include the words above specifically mentioned, derivatives thereof and words of similar import.

*Description*

The mirror construction 10 (FIGURE 1) embodying the invention includes an adjustable support structure 11 for supporting a mirror 12 above and generally outboard of the hood 13 and front fender 14 of a vehicle such as an automobile or a truck generally indicated at 16. The support structure 11 includes a normally upwardly and outwardly extending leg 21 to which is secured a substantially sidewardly extending frame 22.

The frame 22 comprises a preferably identical pair of divergent arms 23 and 24 joined at the outboard or leftward, as seen in FIGURE 1, ends thereof by a pivot clamp 26. The outer ends of the arms 23 and 24 are affixed to the pivot clamp 26 by any convenient fastening means, here a screw 27 (FIGURE 4) and nut 28. The pivot clamp 26 comprises a substantially U-shaped, flexible member, preferably a steel band, the intermediate portion of which snugly encircles the leg 21. The ends of the band are preferably sandwiched between the adjacent ends of the arms 23 and 24. The arms 23 and 24 and leg 21 are preferably tubular and of metal such as chrome plated steel, the ends thereof preferably being flattened and drilled. When the screw 27 is tightened, the clamp 26 firmly and immovably grips the leg 21 and at least to some degree resists pivotal movement of the arms 23 and 24 about the axis of the screw 27. With the screw 27 loosened, the clamp 26 may slide along or pivot on the leg 21.

The inboard or rightward ends of the legs 23 and 24 are affixed to preferably identical step brackets 31 and 32, respectively. The brackets 31 and 32 may be of any convenient configuration adapted to clamping between the hood 13 and fender 14 of the vehicle. In the present embodiment, said brackets each comprises a pair of stepped, substantially horizontal portions 36 and 37 which are joined by a substantially vertical riser 38. The horizontal portion 36 preferably is pivotally affixed by a rivet 33 to the corresponding one of the arms 23 and 24. The edge of the horizontal portion 37 remote from the riser 38 has a depending flange 39. Thus, the outer side of the flange 39 normally rests against the inner surface of the fender, the horizontal portion 37 is normally gripped between the hood 13 and fender 14 and the riser 38 normally lies closely adjacent or rests against the outer surface of the hood 13. The portion 36 is thus elevated above the fender 14 as are normally the arms 23 and 24. At least the lower surface of the horizontal portion 37 is preferably provided with a resilient pad 41 for preventing the brackets 31 and 32 from slipping axially along the joint between the hood and fender.

A cross member 46 (FIGURE 4), preferably of tubular construction similar to that of the arms 23 and 24, is preferably similarly flattened and drilled at its ends. The ends of the cross member 46 are pivotally secured by screws 47 and nuts 48 to pivot clamps 51 and 52, respectively, which are arranged on the arms 23 and 24, respectively, and are preferably similar to the pivot clamp 26. Thus, by tightening of the screws 47, the ends of the cross member 46 may be rigidly fixed to the arms 23 and 24. Loosening of the screws 47 allows the ends of the cross bar 46 to slide along the arms 23 and 24 to a different location such as that indicated in FIGURE 6.

A tensioning assembly 56 (FIGURES 4 and 5) extends between the cross member 46 and the leg 21 below the clamp 26. In the particular preferred embodiment shown, the tensioning assembly 56 comprises a turnbuckle 57 including axially extending eye bolts 58 and 59. The eyes of the eye bolts 58 and 59 are secured by screws 61 and nuts 62 to pivot clamps 63 and 64, respectively, which are disposed on the cross member 46 and leg 21, respectively. The pivot clamps 63 and 64 are preferably identical to the abovementioned pivot clamps 26, 51 and 52. Thus, tightening of the screws 61 rigidly fixes the clamps 63 and 64 to the cross member 46 and leg 21 to prevent relative movement between the ends of the eye bolts 58 and 59 and said leg and cross member. The tightened clamps 63 and 64 preferably allow pivotal movement of the eye bolts about the screws 61. A lock nut 66, in the particular embodiment shown a wing nut, is threaded on one of the eye bolts 58 and 59, here the eye bolt 59, for locking against the adjacent end of the turnbuckle 57. Axial adjustment of the length of the turnbuckle 57 normally causes the arms 23 and 24 to pivot about the screw 27 toward or away from the leg 21.

The lower end of the leg 21 is preferably pivotally secured, here riveted as indicated at 67 (FIGURES 1 and 2), to the upper end of a depending hook 68, here a segment of strap steel bent into a generally J-shaped configuration. The curved lower portion of the hook 68 is directed inwardly and adapted for hooking under the upper edge 69 of the wheel well in the fender 14. The inner surface of the hook 68 is preferably padded as indicated at 70.

The mirror 12 is secured to the upper end of the leg 21 by any convenient means. In the particular embodiment shown, the mirror is provided with a threaded shaft 71 (FIGURE 3) which is secured to the forward face of the mirror 12 by a ball joint 72 of any conventional construction. The shaft 71 passes through the upper end of the leg 21 and a nut 73 threaded on said shaft 71 secures the mirror 12 to the upper end of the leg 21.

*Operation*

The mirror construction 10 may be installed upon a vehicle in any of a number of different ways. When mounting the mirror construction 10 on a particular vehicle for the first time, it is generally preferred that the screws 27, 47, 61 be loosened for allowing the pivot clamps 26, 51, 52, 63 and 64 to slide freely upon the corresponding ones of the arms 23 and 24, leg 21 and cross member 46 and to allow free pivotal movement of the arms, leg and cross member and turnbuckle with respect to each other. The mirror construction in such condition will readily conform to the contours of the vehicle. With the hood 13 of the vehicle raised, the brackets 31 and 32 may be placed on the inner edge of the fender 14 with the pads 41 resting thereon, the flanges 39 extending into the zone normally closed by the hood 13 and the arms 23 and 24 extending outwardly over the fender 14. After the brackets 31 and 32 are spaced along the inner edge of the fender as desired, the hood 13 is shut, the edge thereof thus resting on the horizontal portions 37 of the brackets 31 and 32 to prevent relative movement therebetween. The pads 41 are preferably of a material having a relatively high coefficient of friction, such as rubber, to further prevent movement of brackets toward and away from each other or along the edge of the fender.

The outer ends of the arms 23 and 24 normally extend above and outwardly from the fender 14. The leg 21 may now be slid upwardly or downwardly in the pivot clamps 26 and 64 and may be pivoted with respect thereto to allow the hook 68 to be moved into engagement with the upper edge 69 of the wheel well in the fender 14. The hook normally engages the wheel well edge at a point below the outer ends of the arms 23 and 24 and somewhat inwardly spaced therefrom. Thus, the leg 21 extends upwardly and outwardly from the hook 68. The pivot clamps 26, 51, 52, 63 and 64 may now be tightened to render the mirror construction a rigid unit affixed to the vehicle. Finally, the grip of the mirror construction 10 on the vehicle may be substantially increased by tightening the turnbuckle 57 which strongly urges the hook 68 toward the brackets 31 and 32 and rigidly clamps the mirror construction to the vehicle. The turnbuckle is capable when tightened of prestressing causing a small elastic deformation of the arms, leg and cross member to increase the rigidity with which the mirror 12 is fixed to the vehicle. When the turnbuckle is tightened sufficiently, the wing nut 66 is tightened against the body of the turnbuckle to prevent inadvertent loosening thereof. Installation is completed by suitable adjustment of the plane of the mirror 12 by swiveling same around the ball joint 72 to provide the desired field of vision.

It is normally desirable that the ends of the turnbuckle 57 be spaced from the pivot clamp 26 by substantially equal distances to minimize the axial component of force on the clamps and to maximize the force with which the mirror construction grips the vehicle. Similarly, the clamp 63 is preferably centered on the cross member and the ends of the cross member 46 are preferably equally spaced from the clamp 26.

The mirror may be removed from the vehicle in any of several ways. The mirror construction 10 is particularly advantageous in that it may be removed without tools and very quickly by loosening the lock nut 66, extending the turnbuckle 57 to move the hook 68 downwardly and outwardly out of engagement with the fender 14, and raising the hood 13 to release the brackets 31 and 32.

To reinstall the mirror construction 10 on the same vehicle from which it has thus been removed, the above steps of removal may be reversed.

Referring to FIGURE 6, it will be noticed that the relative positions of the cross member, arms, leg and turnbuckle may be varied widely if desired, for example, for adapting the construction to an unusually shaped vehicle. Thus in FIGURE 6 it will be noted that the turnbuckle 57 is no longer fixed to the cross member at its midpoint and the ends of the cross member 46 are spaced along the arms 23 and 24 at different distances from the leg 21.

*Modification*

Turning now to FIGURE 7, there is disclosed a modified mirror construction 10a. Parts of the modified mirror construction 10a corresponding to parts of the mirror construction 10 described hereinabove with respect to FIGURES 1–6 will carry the same reference numerals thereas with the suffix "a" added thereto. The mirror construction 10a is substantially identical to the mirror construction 10 and differs therefrom only in that the mirror 12a is not mounted upon the upper end of the leg 21a. Instead, an extension member 76 is affixed to the upper end of the leg 21a by any convenient means such as a bolt 77 and nut 78. The extension member 76 is preferably similar to and, in the particular embodiment of the invention shown, is identical to the cross member 46 of the mirror construction 10. It will be recognized that the extension member 76 can be pivoted around the bolt 77 prior to tightening thereof to assume any desired position in the plane of its motion. In normal use, however, the extension member 76 will normally extend upwardly and outwardly from the upper end of the leg 21a as shown in FIGURE 7. The mirror 12a is secured to the upper end of the extension member 76 preferably by a nut 73a in a manner similar to that in which the mirror 12 is secured to the upper end of the leg 21 as described hereinabove with respect to FIGURES 1–6. Provision of the extension member 76 allows the mirror 12a to be spaced outwardly from the upper end of the leg 21a and, hence, affords the vehicle driver an adequate rear view around an abnormally wide trailer or the like towed by the vehicle.

Although particular preferred embodiments of the invention have been disclosed above for illustrative purposes, it will be apparent that variations or modifications thereof which lie within the scope of the appended claims are fully contemplated.

The embodiments of the invention in which an exclusive property or privilege is claimed are defined as follows:

1. A mirror construction for mounting on a vehicle comprising in combination:
   frame means fixed at one side thereof to said vehicle and extending transversely away therefrom;
   leg means in engagement with said frame means at a location spaced from said one side;
   engagement means on said leg means below said frame engageable with said vehicle at a point spaced from said one side;
   a mirror mounted on said leg means above said frame means;
   tension means extending obliquely between said frame means and said leg means, said tension means being axially adjustable for causing said leg means and said frame means to grip said vehicle therebetween.

2. In a mirror construction for mounting on an automotive vehicle engageable with said vehicle at the joint between the side edges of the hood and front fender thereof and at the edge of the adjacent wheel opening therein, the combination comprising:
   a divergent, substantially horizontal pair of arms joined at one end thereof;
   stepped brackets on the other ends of said arms engageable between the hood and fender of said vehicle;
   a cross member extending between said arms between the ends thereof;
   an upwardly and outwardly extendable leg slideably and pivotally affixed to the joined ends of the arms;
   a mirror and means for affixing said mirror to the upper end of said leg;
   an upwardly opening hook affixed to the lower end of said leg for engaging the upper edge of the wheel opening of the vehicle fender;
   a turnbuckle connected between said cross member and said leg at a point on said leg spaced below said one end of said arms for urging said hook toward said brackets.

3. The device defined in claim 2 in which said arms, said cross member and said leg are straight tubular members, in which said other ends of said arms are pivotally affixed to said brackets and wherein said hook is pivoted for movement about an axis substantially parallel to the face of said mirror.

4. The device defined in claim 2 including clamps on said arms pivotally secured to the ends of said cross member and adjustable for allowing said ends of said cross member to slide along and pivot around said arms and, alternatively, for clamping said cross member rigidly to said arms.

5. The device defined in claim 2 including clamps on said cross member and said leg adjustable for sliding therealong and alternatively adjustable for tightly gripping same, said clamps being pivotally affixed to the ends of said turnbuckle for allowing adjustment of the angular position of said turnbuckle with respect to the arms and cross member through a wide range of angles.

6. The construction defined in claim 2 including a clamp on said leg adjustable for sliding therealong between said mirror and said turnbuckle and alternatively adjustable for tightly gripping said leg, said clamp being pivotally affixed to said one end of said arms.

7. The device defined in claim 2 in which said turnbuckle includes threaded shaft extending outwardly therefrom and including a lock nut threaded on said shaft for preventing a change in the length of said turnbuckle.

8. The device defined in claim 2 in which said means for fixing said mirror to the upper end of said leg includes an extension member pivotally secured to and lockable with respect to said leg adjacent the upper end thereof, said extension being capable of extending upwardly and outwardly from said leg, said mirror being mounted upon the free end of said extension member.

9. A mirror construction for mounting on a vehicle, comprising in combination:
   frame means fixed on one side thereof to said vehicle and extending transversely away therefrom;
   leg means in engagement with said frame means at a location spaced from said one side;
   engagement means on said leg means below said frame engageable with said vehicle at a point spaced from said one side;
   a mirror mounted on said leg means above said frame means; and
   tension means extending obliquely between said frame means and said leg means for causing said leg means and said frame means to grip said vehicle therebetween.

10. In a mirror construction for mounting on an automotive vehicle engageable with said vehicle at the joint between the side edges of the hood and front fender thereof and at the edge of the adjacent wheel opening therein, the combination comprising:
- a divergent, substantially horizontal pair of arms joined at one end thereof;
- brackets on the other ends of said arms engageable between the hood and fender of the vehicle;
- a cross member extending between said arms between the ends thereof;
- an upwardly and outwardly extendable leg slideably and pivotally affixed to the joined ends of the arms;
- a mirror and means for affixing said mirror to the upper end of said leg;
- an upwardly opening hook affixed to the lower end of said leg for engaging the upper edge of the wheel opening of the vehicle fender;
- tension means connected between said cross member and said leg at a point on said leg spaced below said one end of said arms for urging said hook toward said brackets.

References Cited by the Examiner
UNITED STATES PATENTS

| | | | |
|---|---|---|---|
| 2,552,074 | 5/1951 | Thompson | 248—279 |
| 3,081,057 | 3/1963 | Farnsworth | 248—226 |
| 3,168,277 | 2/1965 | Stewart | 248—226 |

CLAUDE A. LE ROY, *Primary Examiner.*

K. L. WINGERT, *Assistant Examiner.*